United States Patent [19]

Koppers et al.

[11] Patent Number: 4,640,650

[45] Date of Patent: Feb. 3, 1987

[54] HYDRAULICALLY OPERATED UNIT FOR ROOF SUPPORT

[75] Inventors: Manfred Koppers, Duisburg; Karlheinz Bohnes, Bochum; Friedel Amling, Gelsenkirchen, all of Fed. Rep. of Germany

[73] Assignee: Bochumer Eisenhütte Heintzmann GmbH & Co. Kg, Bochum, Fed. Rep. of Germany

[21] Appl. No.: 521,735

[22] Filed: Aug. 9, 1983

[30] Foreign Application Priority Data

Jun. 9, 1983 [DE] Fed. Rep. of Germany ....... 3320759

[51] Int. Cl.$^4$ ............................................. E21D 15/50
[52] U.S. Cl. ...................... 405/290; 29/525; 405/303
[58] Field of Search ............... 405/291, 290, 294, 293, 405/297, 298, 299; 29/525

[56] References Cited

U.S. PATENT DOCUMENTS

| 2,500,340 | 3/1950 | Boulton | 29/525 X |
| 3,004,323 | 10/1961 | Pitner | 29/525 X |
| 3,084,003 | 4/1963 | Matt et al. | 29/525 UX |
| 3,308,524 | 3/1967 | Moyer | 29/525 X |
| 3,428,338 | 2/1969 | Corwin | 29/525 X |
| 4,347,966 | 9/1982 | Feutrel | 29/525 X |

FOREIGN PATENT DOCUMENTS

| 1898705 | 6/1964 | Fed. Rep. of Germany . |
| 2728226 | 1/1979 | Fed. Rep. of Germany . |
| 2813228 | 10/1979 | Fed. Rep. of Germany . |
| 2708929 | 4/1980 | Fed. Rep. of Germany ...... 405/295 |

Primary Examiner—Dennis L. Taylor
Attorney, Agent, or Firm—Michael J. Striker

[57] ABSTRACT

In a hydraulically operated unit, particularly a prop for a support in an underground excavation, a thin-walled tubular jacket is pressed on an inner element which is movable in an outer tubular element so that the tubular jacket has an inner diameter which is determined with a substantial undersizing relative to the outer diameter of the inner element, and the tubular jacket is clamped on the inner element with exceeding of the flow limit of the inner element and only in a plastic expansion condition which exceeds with a reliable distance and elastic deformation region of the tubular jacket and with a sufficient residual springing part.

14 Claims, 7 Drawing Figures

HYDRAULICALLY OPERATED UNIT FOR ROOF SUPPORT

BACKGROUND OF THE INVENTION

The present invention relates to a hydraulically operated unit, particularly a prop, for a roof support in underground operations. The invention also relates to a method of manufacturing such a hydraulically operated unit.

It is known in the prior art to coat piston rods, tubular pistons or inner cylinders composed of steel with chromium, nickel, zinc, paint or a synthetic plastic coating. The thickness of such a corrosion-protective layer lies in the range below 100 microns. These coatings do not, however, provide sufficient protection against aggressive weather and water as well as high impact loads which act upon the inner parts of the working cylinder incorporated in the roof support in underground operations.

In addition to the chemical or organic coating, it has also been proposed to provide the inner parts with thin-walled tubular jackets. The DE-OS No. 2,813,228 discloses a method in accordance with which a cylindrical pipe has a very narrow fit, or in other words with a play, and is fitted onto another pipe or a round material with utilization of force. The fitting takes place in such a manner that the tubular jacket is subjected to a heat treatment and during the heat treatment a continuously acting pulling tension is applied. The expenses needed for the respective device are very high, and a very accurate monitoring is required.

The DE-GM No. 1,898,705 discloses a piston of a hydraulically activated working cylinder which is coated with a thin sheet of corrosion-resistant material. For this purpose the jacket sheet is placed in a foldable sleeve and subsequently is introduced onto the piston provided on its surface with a hardenable synthetic plastic intermediate layer. After hardening of the synthetic plastic intermediate layer, the sleeve can be removed and the piston is provided with the coating.

The DE-OS No. 2,728,226 discloses a proposal in accordance with which the outer surfaces of hollow piston rods are protected with thin-walled fine steel having a wall thickness of 0.2–1 mm. The tubular jacket is produced by longitudinal or spiral welding or by hydraulic pressing onto a mandrel. The placing of the tubular jacket is performed by expanding the carrier tube. The expansion can be carried out by hydraulic pressure or piston pressure. In both cases, an insulation layer between the carrier tube and the tubular jacket is provided. When the insulation layer can be dispensed with or the carrier tube is composed of aluminum and provided with an anodic oxidation layer, the tubular jacket can also be fitted onto the same.

Finally, the DE-AS No. 2,708,929 discloses the proposal in accordance with which the inner cylinder of a mine prop is provided with an outer protective jacket of a fine steel pipe with a wall thickness of 0.2–0.1 mm. It is indicated that the inner cylinder and the protective jacket having the same E modulus can be fixedly connected with one another by pressing. However, it is not disclosed there how the pressing is to be carried out. This reference also does not explain the utilization of the specific properties of the material, with the exception of the same E modulus.

SUMMARY OF THE INVENTION

Accordingly, it is an object of the present invention to provide a hydraulically operated unit and a method of manufacturing the same, which avoids the disadvantages of the prior art.

More particularly, it is an object of the present invention to provide a hydraulically operated unit and a method of manufacturing the same in which coating of the inner part of a working cylinder for mine roof support provides for high accuracy and surface quality required for such high grade hydraulic working elements, and withstands loadings and forces acting thereon in practical use.

In keeping with these objects and with others which will become apparent hereinafter, one feature of the present invention resides, briefly stated, in that the inner diameter of a thin-walled tubular jacket pressed on an inner element of a hydraulically operated unit is selected with such an undersize relative to the outer diameter of the inner element, that the tubular jacket is clamped on the inner element with exceeding of the flow limit of the inner element and only in a plastic expansion condition which exceeds an elastic deformation region of the tubular jacket with a reliable distance and with a sufficient residual springing part.

In accordance with the present invention, it is possible to mount tubular jackets on piston rods, tubular pistons or inner cylinders with the utilization of the resistance to deformation in exclusively plastic deformation region of the fine steel. An extremely high clamping force can be provided which guarantees that the tubular jacket remains reliably clamped on the inner part.

The structurally intentionally provided undersize of the inner diameter of the tubular jacket is selected so great that, under consideration of the tolerance-required size deviation in the outer diameter of the inner part, the elastic deformation region of the tubular jacket is exceeded with a sufficiently reliable distance, and purely plastic expansion condition of the same is also reliably maintained in each operational phase. Naturally in this purely plastic expansion condition of the tubular jacket, a material-specific springy residual clamping which is essential for the functioning of the entire working cylinder, especially in underground regions, is retained. It is substantially dependent on the degree of the plastic expansion condition and in each case is substantially higher than one which would act in the purely elastic deformation region.

Because of the special type of clamping of the tubular jacket on the inner element, only very coarse fine steel enclosing is needed. Therefore, it can be brought to a desired diameter without expensive calibration processes. Eventual welding distortion is automatically eliminated. In addition to the required resistance against aggressive weather and water, the covering which withstands high impact forces also unobjectionably resists such loads as for example generated by the elastic bending of piston rods, or by the elastic expansion of tubular pistons or inner cylinders in the event of increased hydraulic pressure. The pressing-on with intended exceeding of the flow limit also adds to advantageous strength increase of the tubular jacket material and therefore provides for higher reliability against mechanical loads.

In accordance with another feature of the present invention, the tubular jacket is axially pressed onto the inner element with an expansion of substantially 1% with a tolerance of substantially γ0.5%. When this inventive feature is employed, the tubular jacket, which is manufactured very coarsely in the sense of its diameter uniformity, is forcibly brought to the desired end value. Preceding calibration steps are not necessary. The expansion value of 1% lies essentially far from the breaking expansion which is active at substantially 50%. It is absolutely sufficient to impart to the tubular jacket the required tension with a high elastic residual springing part, so as to overcome all deformations of the inner element (piston rods, tubular pistons, inner cylinders) for hydraulic working cylinders in underground use without damaging the functions.

Still a further feature of the present invention is that the wall thickness of the tubular pipe is substantially equal to 1 mm with a tolerance of ±0.5 mm. The thus dimensioned wall thickness of the tubular jacket is sufficient for preventing the undesirable "breakdown" of the corrosion-protection layer. An so, swelling is thereby eliminated, from which the damaging corrosion can expand.

The tubular pipe can be produced as a seamless member. On the other hand, it can be produced as a longitudinally welded or spirally welded member. As an initial material, a fine steel sheet with a thickness of substantially 1 mm and a tolerance of ±0.5 mm can be used. The longitudinal or width-directed cut can be produced relatively coarsely.

In accordance with another advantageous feature of the present invention, the surface roughness RT of the tubular jacket with a relatively narrow wall thickness tolerance is smaller than 5 microns. Rounding and welding of the tubular pipe substantially corresponds to the present state of the art. The inner element provided with the protective jacket has an outer diameter which takes into account the wall thickness of the tubular jacket. With a diameter deviation from the nominal value within the tolerance, the sheet thickness tolerance must also be considered.

In accordance with a further feature of the present invention, the fitting of the tubular jacket onto the inner element is performed first in that a tubular guiding piece with a conical guiding incline and a maximum outer diameter in significantly smaller than the outer diameter of the inner element is brought at the end side onto the inner element, and then the tubular jacket having an undersize is fitted onto the guiding incline and without thermal treatment axially pressed with radial expansion onto the inner element.

The normal force required for pressing of the tubular jacket is substantially dependent upon the predetermined undersize between the tubular jacket and the inner element, upon the length of the tubular jacket and its surface roughness. For this purpose it is useful when the surface roughness of fine steel sheet, depending upon the manufacturing process, is ideally low. The force required for expansion of the tubular jacket, which has a thickness of for example 1 mm with an expansion value of approximately 1% is relatively small. The pressing force increases as a function of the length of the tubular jacket with increased fitting length, but simultaneously reduces the free bending length. Since in the strength computation it decreases quadratically, as in the event of the stability problems (Euler's Formula), the inventive method permits coating of relatively long inner parts of hydraulic working cylinders for underground roof supports, formed by massive piston rods, tubular pistons and inner cylinders.

The advantage of providing the tubular guiding piece is that the prop inner pipe does not need to be provided with insertion inclines at its own for bringing the tubular jacket. The useful length of the prop inner pipe is increased.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1A:
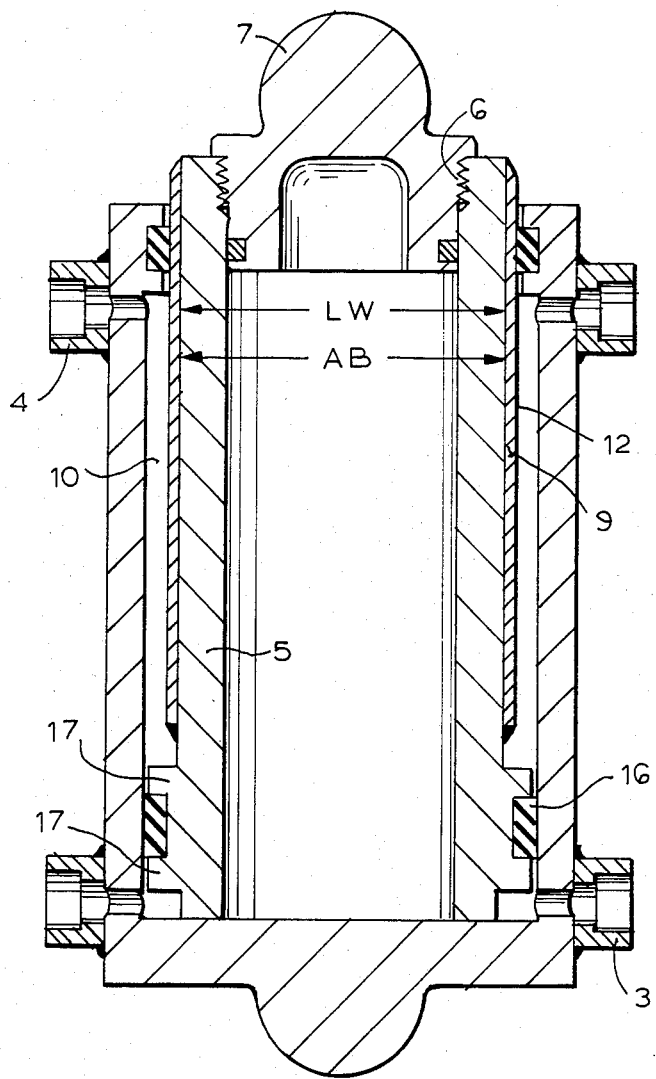
FIGS. 1a and 1b are views showing a vertical section of a hydraulically operated prop for a mine roof support in two working positions.
Figure 1B:
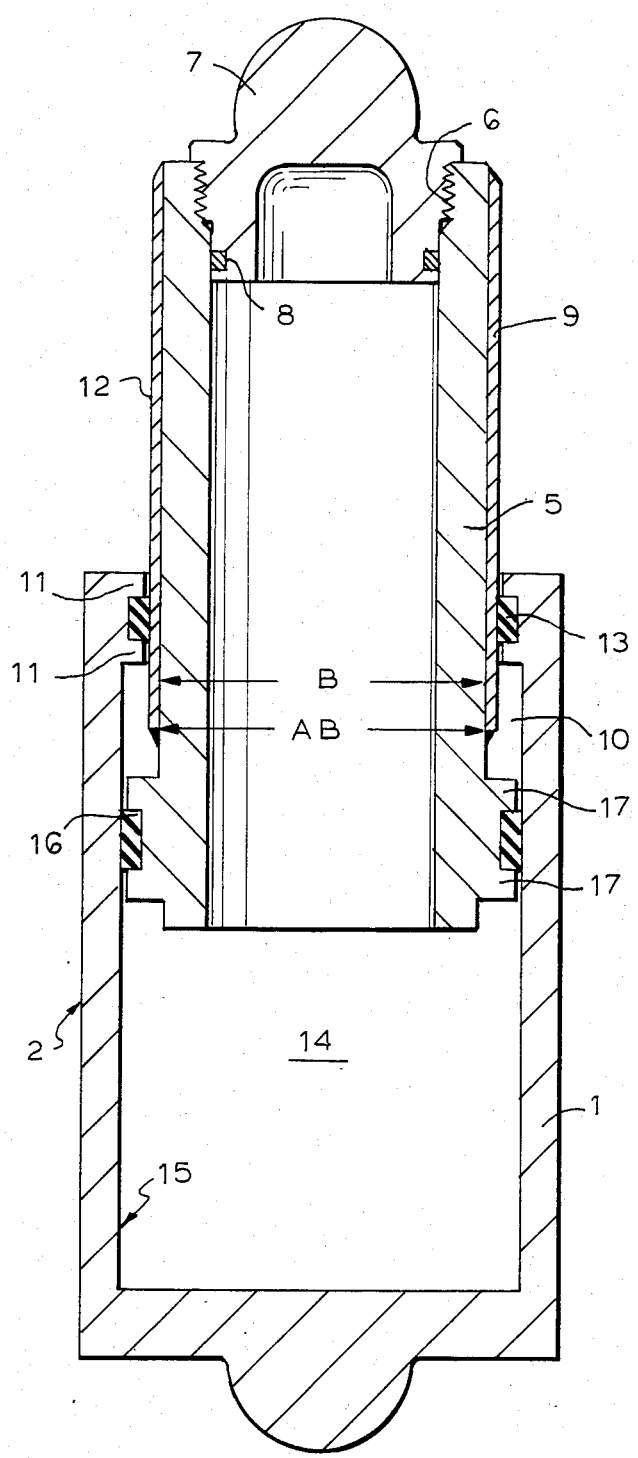

FIGS. 1a, 1b show an outer pipe identified with reference numeral 1 of a prop identified with reference numeral 2 and incorporated for example in a mine roof support between a sole and a shield, or a roof. The connections for a hydraulic working medium are identified with reference numerals 3 and 4.

A tubular inner element 5 is longitudinally movably guided in the outer pipe 1. The inner pipe 5 is provided at its outer end with an inner thread 6 which is threaded into a prop head 7. For sealing between the prop head 7 and the inner pipe 5, a sealing element 8 is provided.

A thin-walled coating of rustless fine steel pipe is mounted on the periphery of the inner pipe 5. The wall thickness of the coating 9 formed as a tubular jacket amounts to substantially 1 mm. The tubular jacket 9 has a surface roughness Rt which is smaller than 5 microns.

Sealing of a ring-shaped working chamber 10 between the inner pipe 5 and the outer pipe 1 toward atmosphere is provided by two radially inwardly extending shoulders 11 provided at the upper end of the outer pipe 1 and accommodating a sealing element 13 which abuts against an outer surface 12 of the tubular jacket 9.

An inner chamber 14 of the prop is sealed from the annular chamber 10 by a sealing element 16 which abuts against an inner surface 15 of the outer pipe 1. It is accommodated between two radially outwardly extending shoulders 17 provided at an inner end of the inner pipe 5.

Figure 2:
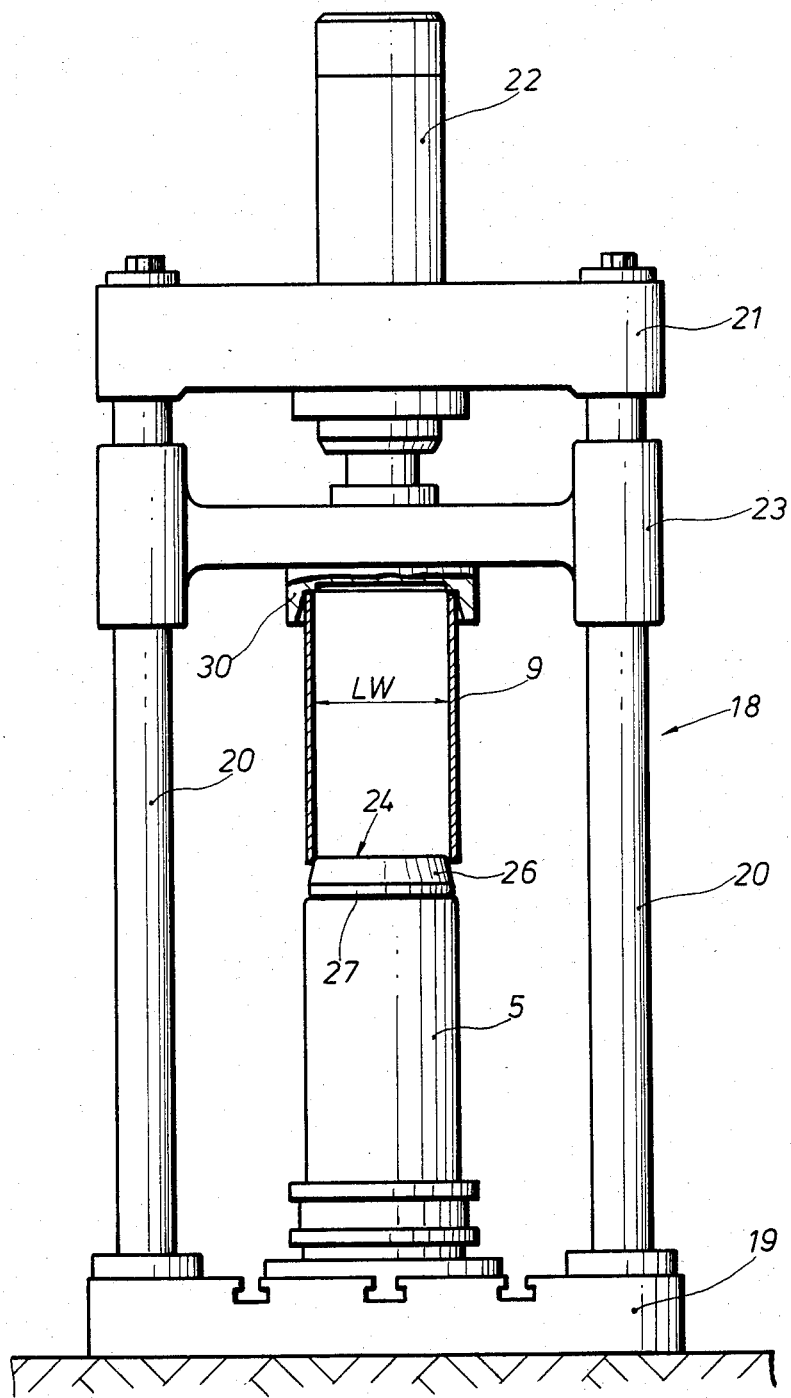
FIG. 2 is a partially sectioned plan view of an arrangement for pressing a tubular jacket onto an inner pipe of the prop of FIG. 1.

For clamping the tubular jacket 9 onto the inner pipe 5, a press 18 schematically shown in FIG. 2 is used. It includes a grooved base plate 19 with at least two guiding columns 2 extending vertical and parallel to one another. A traverse 21 connects the guiding columns 2 at their free ends. The traverse 21 also serves for supporting a hydraulically operated pressure cylinder 22 which acts upon a carriage 23 to forcibly movable along the column 20.

From the joint consideration of FIGS. 2, 3a, 3b, 4a, 4b, it can be seen that for pressing the tubular jacket 9 the inner pipe 5 is first fixed on the base plate 19 of the press 18. At the end side of the inner pipe 5 an adapter-like tubular guiding piece 24 is brought. The tubular guiding piece 24 engages with its pin-like projection 25 into the inner thread 6 of the inner pipe 5. It has a conical insertion incline 26 which merges into a smaller cylindrical longitudinal portion 27. The diameter of the cylindrical longitudinal portion 27 is only insignificantly smaller than the outer diameter AD of the inner pipe 5. A transition 29 from the conical insertion incline 26 to an end surface 28 of the tubular guiding piece 24 is rounded.

Figure 3A:
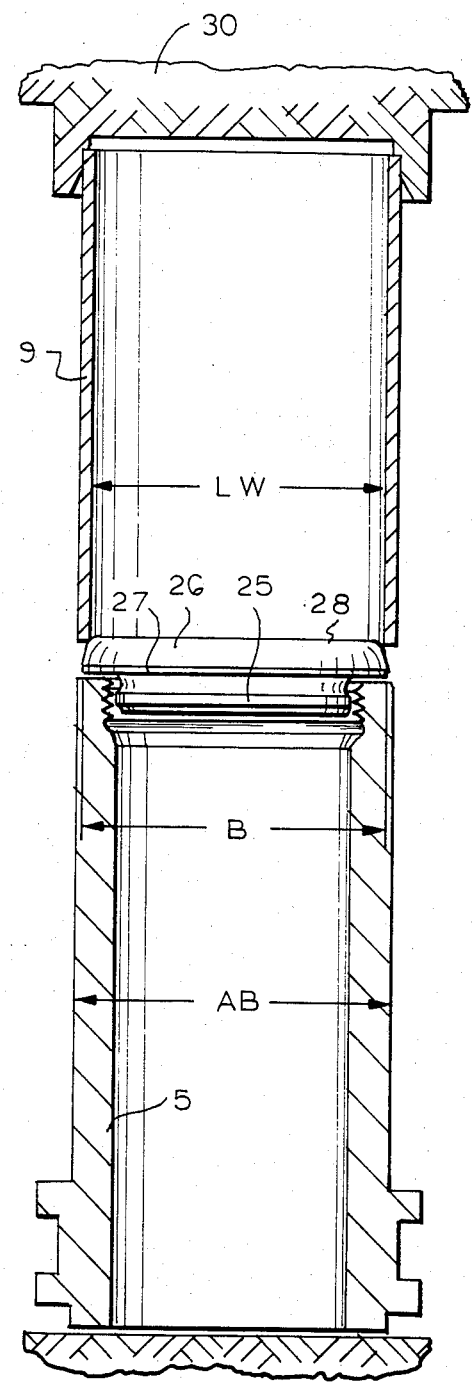
FIGS. 3a, 3b, 4a and 4b are views showing various working phases during pressing of the tubular jacket onto the inner pipe of the prop.

After insertion of the tubular guiding piece 24 into the inner pipe 5 the tubular jacket 9 in FIGS. 2 and 3a is fitted onto the insertion incline 26 and is fixed with the aid of a centering head piece 30 provided at the free end of the tubular jacket 9 axially to the inner pipe 5 and parallel to the guiding columns 20 under the pressing carriage 23.

Figure 3B:
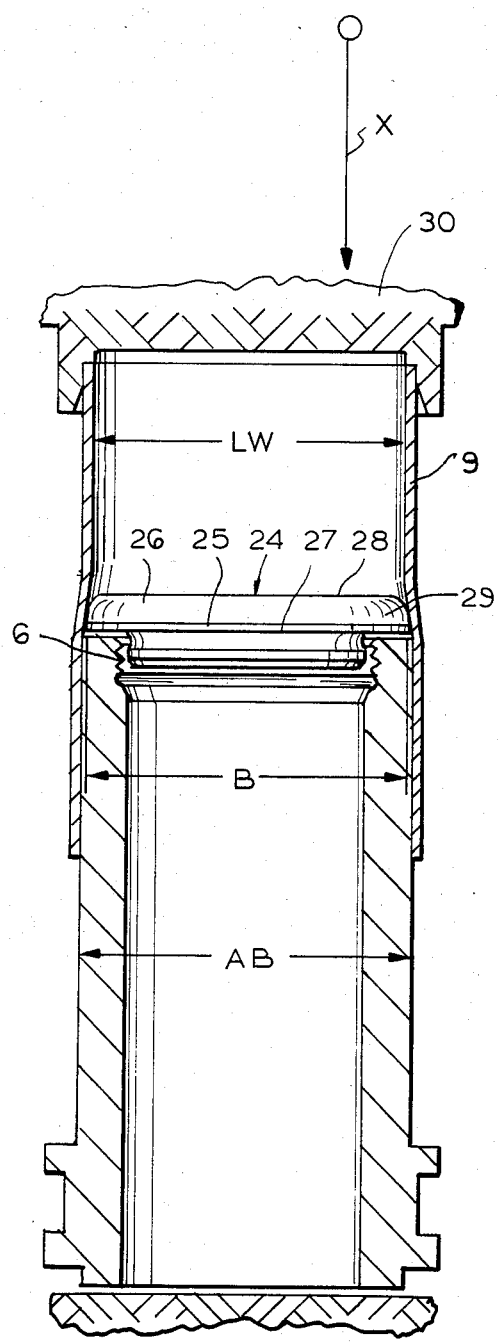
Figure 4A:
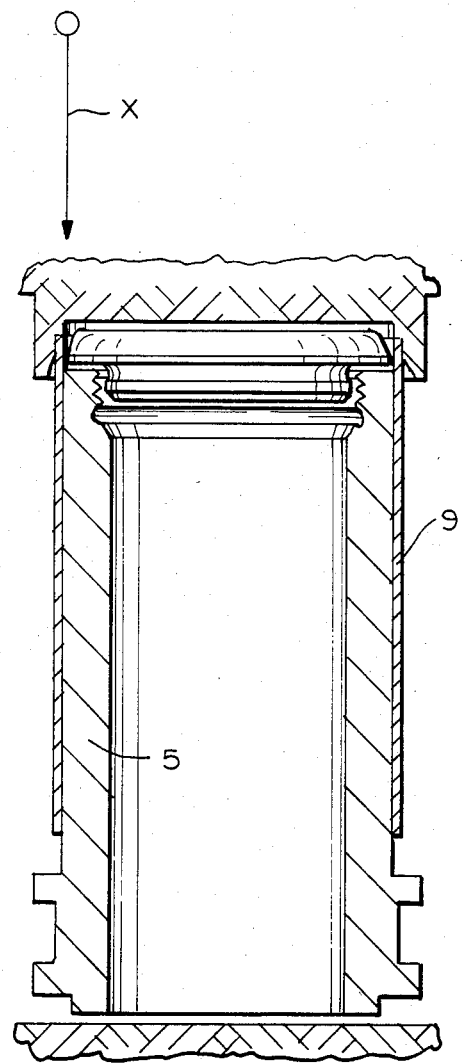
Figure 4B:
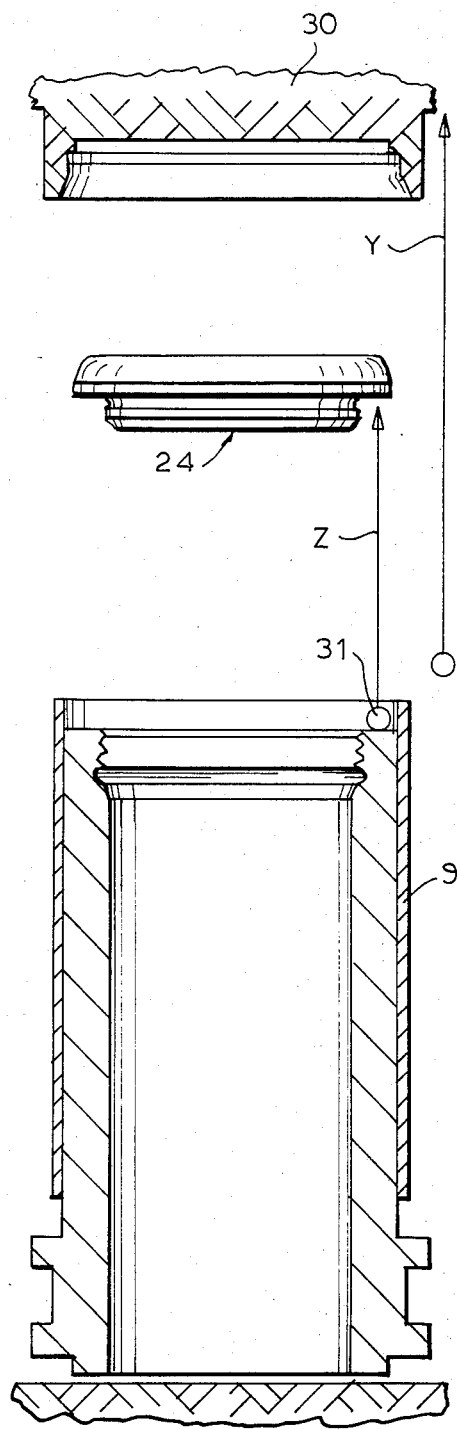

Then the tubular jacket 9 as shown in FIG. 3b is fitted in the direction of the arrow X under the action of the pressure cylinder 22 onto the inner pipe. For this purpose the inner diameter LW of the tubular pipe 9 with maintaining of an essential undersize UM (UM=AD−LW) is so determined relative to the outer diameter AD of the inner pipe 5, that the tubular jacket 9 by intentional exceeding of the flow limit clamps the inner pipe 5 only in plastic expansion condition which exceeds the elastic deformation region with a reliable distance and with a sufficient residual springing part, as shown in FIGS. 4a, 4b. Thus, the tubular jacket 9 has with a wall thickness of substantially 1 mm an expansion of approximately 1%.

The end position of the tubular jacket 9 of FIG. 4a, the pressing carriage 23 with the head piece 30 move upwardly in direction of the arrow Y and then the tubular guiding piece 24 moves away from the inner pipe 5 in the direction of the arrow Z.

Finally, the protective jacket 9 in the region of an end surface 31 of the inner pipe 5 is shortened, and at its other end is additionally welded with the inner pipe 5.

It will be understood that each of the elements described above, or two more together, may also find a useful application in other types of constructions differing from the types described above.

While the invention has been illustrated and described as embodied in an hydraulically operated unit and a method of manufacturing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A hydraulically operated unit, particularly a prop for a support in underground operations, comprising an outer tubular element; an inner element movable relative to said outer element and having a predetermined outer diameter and a flow limit; and a thin-walled tubular jacket pressed on said inner element and having an inner diameter which is determined with such an undersize relative to said outer diameter of said inner element that said tubular jacket is clamped on said inner element with exceeding of said flow limit of said inner element and only in a plastic expansion condition of said tubular jacket which plastic expansion condition of said tubular jacket exceeds an elastic deformation region of said tubular jacket with a reliable distance and with a sufficient residual springing part of said tubular jacket.

2. A hydraulically operated unit as defined in claim 1, wherein said inner element is a fine steel tube.

3. A hydraulically operated unit as defined in claim 1, wherein said inner element is formed as a piston rod.

4. A hydraulically operated unit as defined in claim 1, wherein said inner element is formed as a tubular piston.

5. A hydraulically operated unit as defined in claim 1, wherein said inner element is formed as an inner cylinder.

6. A hydraulically operated unit as defined in claim 1, wherein said tubular jacket is pressed axially on said inner element with an expansion of substantially 1% with a tolerance of substantially ±0.5%.

7. A hydraulically operated unit as defined in claim 1, wherein said tubular jacket has a wall thickness of substantially 1 mm with a tolerance of substantially ±0.5 mm.

8. A hydraulically operated unit as defined in claim 1, wherein said tubular jacket is longitudinally welded.

9. A hydraulically operated unit as defined in claim 1, wherein said tubular jacket is spirally welded.

10. A hydraulically operated unit as defined in claim 1, wherein said tubular jacket has a relatively narrow wall thickness tolerance and a surface roughness Rt smaller than 5 microns.

11. A hydraulically operated unit as defined in claim 1, wherein said tubular jacket is fixedly connected with said inner element; and further comprising means for fixedly connecting said tubular jacket with said inner element.

12. A hydraulically operated unit as defined in claim 11, wherein said connecting means includes at least one weld seam which connects said tubular jacket with said inner element.

13. A hydraulically operated unit as defined in claim 11, wherein said tubular jacket has two axially spaced ends, said connecting means being arranged adjacent to one of said axial ends of said tubular jacket.

14. A hydraulically operated unit as defined in claim 11, wherein said tubular jacket has two axial ends; and further comprising sealing means arranged between said tubular jacket and said outer tubular element in the region of one of said axial ends, said connecting means being arranged adjacent to said sealing means in the region of said one axial end.

* * * * *